(12) United States Patent
Seok et al.

(10) Patent No.: US 12,423,048 B2
(45) Date of Patent: Sep. 23, 2025

(54) DISPLAY DEVICE AND SCREEN SHARING OPERATION METHOD THEREOF

(71) Applicant: LG ELECTRONICS INC., Seoul (KR)

(72) Inventors: Sangin Seok, Seoul (KR); Sungeun Shin, Seoul (KR); Yoonhee Koo, Seoul (KR); Gijung Jang, Seoul (KR); Seunghun Lee, Seoul (KR); Kangil Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/692,263

(22) PCT Filed: Sep. 28, 2021

(86) PCT No.: PCT/KR2021/013226
§ 371 (c)(1),
(2) Date: Mar. 14, 2024

(87) PCT Pub. No.: WO2023/042950
PCT Pub. Date: Mar. 23, 2023

(65) Prior Publication Data
US 2024/0256209 A1    Aug. 1, 2024

(30) Foreign Application Priority Data
Sep. 15, 2021   (KR) .................. 10-2021-0123410

(51) Int. Cl.
*G06F 3/14*    (2006.01)
(52) U.S. Cl.
CPC .................. *G06F 3/1454* (2013.01)
(58) Field of Classification Search
CPC ..... G06F 3/0481; G06F 3/1454; G06F 3/0482
See application file for complete search history.

(56) References Cited

U.S. PATENT DOCUMENTS

2014/0359493 A1    12/2014  Hong et al.
2015/0082184 A1*    3/2015  Kim ................ H04W 4/50
                                                  715/740
(Continued)

FOREIGN PATENT DOCUMENTS

KR    20140140957    12/2014
KR    20170027435    3/2017
(Continued)

OTHER PUBLICATIONS

Machine translation to English of KR-20190035414 (Apr. 3, 2019) Shin et al. (Year: 2019).*

(Continued)

*Primary Examiner* — Benjamin C Lee
*Assistant Examiner* — Nathan P Brittingham
(74) *Attorney, Agent, or Firm* — LEE, HONG, DEGERMAN, KANG & WAIMEY

(57) ABSTRACT

A display device according to the present disclosure may include a display part; a wireless communication part configured to perform wireless communication with a first portable device connected to a first terminal displaying a first image or a second portable device connected to a second terminal displaying a second image; and a controller configured to: when a screen sharing request is received from the first portable device, determine whether a management mode for managing screen sharing of the second portable device connected to the second terminal is activated, when the management mode of the second portable device is activated, determine whether screen sharing permission has been received from the second portable device, when the screen sharing permission is received, receive the first image data corresponding to the first image from the portable device, and based on the received first image data, display first mirroring image on the display part.

11 Claims, 13 Drawing Sheets

(56) References Cited

U.S. PATENT DOCUMENTS

| | | |
|---|---|---|
| 2015/0189218 A1 | 7/2015 | Kim et al. |
| 2017/0060518 A1 | 3/2017 | Hong et al. |
| 2019/0265938 A1 | 8/2019 | Kim et al. |
| 2020/0388248 A1 | 12/2020 | Kimata et al. |
| 2021/0149618 A1 | 5/2021 | Lee et al. |
| 2022/0300239 A1* | 9/2022 | Nakamura ............. H04N 7/147 |

FOREIGN PATENT DOCUMENTS

| | | |
|---|---|---|
| KR | 20180041961 | 4/2018 |
| KR | 20190035414 | 4/2019 |
| KR | 20190101829 | 9/2019 |
| KR | 102078867 | 2/2020 |
| KR | 20200021735 | 3/2020 |
| KR | 102143222 | 8/2020 |
| KR | 20210009027 | 1/2021 |
| KR | 102243220 | 4/2021 |
| KR | 20210061199 | 5/2021 |

OTHER PUBLICATIONS

PCT International Application No. PCT/KR2021/013226, International Search Report dated Jun. 2, 2022, 2 pages.
Korean Intellectual Property Office Application No. 10-2021-0123410, Notice of Allowance dated Sep. 22, 2022, 9 pages.
European Patent Office Application Serial No. 21957618.8, Search Report dated Apr. 22, 2025, 11 pages.

* cited by examiner

DISPLAY DEVICE AND SCREEN SHARING OPERATION METHOD THEREOF

CROSS-REFERENCE TO RELATED APPLICATION(S)

This application is the National Stage filing under 35 U.S.C. 371 of International Application No. PCT/KR2021/013226, filed on Sep. 28, 2021, which claims the benefit of earlier filing date and right of priority to Korean Application No. 10-2021-0123410, filed on Sep. 15, 2021, the contents of which are all incorporated by reference herein in their entirety.

TECHNICAL FIELD

The present disclosure relates to a display device and a method for operating the same.

BACKGROUND ART

There are many cases where the PC screen needs to be shared with a separate large display device.

An individual may want to share the screen with a large display device to view a larger screen, or may want to share the screen of a personal laptop in a public space such as a conference room so that multiple people can view the same screen.

In particular, since several people may want to share the screen sequentially or simultaneously, screen sharing methods using existing HDMI cables or PC Miracast cannot provide greater convenience to users.

Specifically, in a case of a method for connecting a PC and a display device with an HDMI cable, since it uses a wired cable line, there may be distance restrictions according to the length of the cable line, and there is the inconvenience of not being able to share multiple PC screens at the same time.

Additionally, PCs provide the ability to share the screen using Miracast as standard. Since the Miracast screen sharing method is a technology which transmits the screen using the PC's WIFI-Direct, it can only be used when the PC is connected to the display device's WIFI.

Because of this, when a PC shares its screen, there is a limitation in that it cannot use any other WIFI other than the currently connected Display.

Additionally, since it only supports 1:1 connection, you cannot share multiple PC screens at the same time. If your PC screen is currently being shared and you want to share another PC's screen, there is the inconvenience of having to terminate the existing connection and then make a new connection.

In addition, when using other wireless sharing methods, the user must install a separate program suitable for the display device and separate settings are often required, which may cause inconvenience in the user's operation of the device.

DISCLOSURE

Technical Problem

An object of the present disclosure is to provide a method which shares a PC screen in a wireless environment without using a wired cable, does not place restrictions on the use of PC Wi-Fi, and conveniently installs a screen sharing program.

An object of the present disclosure is to facilitate sequential or simultaneous sharing of multiple PC screens.

Technical Solution

A display device according to the present disclosure may include a display part; a wireless communication part configured to perform wireless communication with a first portable device connected to a first terminal displaying a first image or a second portable device connected to a second terminal displaying a second image; and a controller configured to: when a screen sharing request is received from the first portable device, determine whether a management mode for managing screen sharing of the second portable device connected to the second terminal is activated, when the management mode of the second portable device is activated, determine whether screen sharing permission has been received from the second portable device, when the screen sharing permission is received, receive the first image data corresponding to the first image from the portable device, and based on the received first image data, display first mirroring image on the display part.

Advantageous Effect

According to an embodiment of the present disclosure, the screen of a terminal may be shared with a display device having a large screen in a wireless environment without a separate wired cable.

Additionally, since image data for screen sharing is transmitted to the display device through a portable device, there are no restrictions on using the terminal's Wi-Fi standard.

Additionally, there is a management mode for portable devices, so you can check the status of other portable devices you are currently sharing.

Additionally, you can change the order of entire screen composition in multi-screen sharing mode or cancel the screen of a specific portable device.

Additionally, since screen sharing is possible only after obtaining permission from the device in an admin mode, you can prevent unnecessary screen sharing with other portable devices.

Additionally, since the portable device itself transmits the image/audio data of the terminal to the display device, there is no need for a separate module for data transmission, which may reduce costs and simplify the configuration of the device.

BEST MODE

Hereinafter, embodiments related to the present disclosure will be described in more detail with reference to the drawings. The suffixes "module" and "part" for components used in the following description are given or used interchangeably only for the ease of preparing the specification, and do not have distinct meanings or roles in themselves.

The display device according to an embodiment of the present disclosure is, for example, an intelligent display device that adds a computer support function to the broadcast reception function, and is faithful to the broadcast reception function while adding an Internet function and the like, and thus can be equipped with a more convenient interface such as a handwriting input device, a touch screen, or a spatial remote control. In addition, by supporting wired or wireless Internet functions, it is possible to connect to the Internet and a computer and perform functions such as email, web browsing, banking, or gaming. A standardized general-purpose operating system (OS) can be used for these various functions.

Accordingly, in the display device described in the present disclosure, for example, various applications can be freely added or deleted on a general-purpose OS kernel, so various user-friendly functions can be performed. More specifically, the display device may be, for example, a network TV, HBBTV, smart TV, LED TV, OLED TV, or the like, and in some cases, may also be applied to a smartphone.

Figure 1:
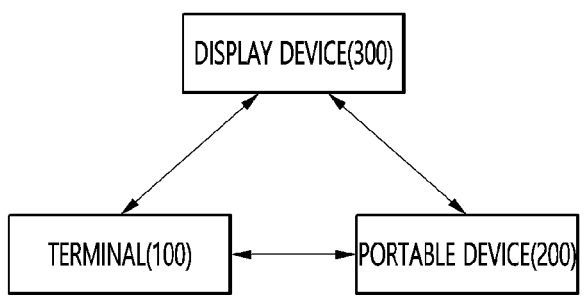
FIG. 1 is a diagram illustrating the configuration of a screen sharing system according to an embodiment of the present disclosure.

FIG. 1 is a diagram illustrating the configuration of a screen sharing system according to an embodiment of the present disclosure.

The screen sharing system 1 may include a terminal 100, a portable device 200, and a display device 300.

The terminal 100 may be a computer such as a PC or laptop, but this is only an example.

The terminal 100 and the portable device 200 may be connected wirelessly or wired. The terminal 100 and the portable device 200 can be connected to each other through the USB standard.

The portable device 200 and the terminal 100 may each be composed of a plurality of devices.

The portable device 200 is a dongle type and can be connected to the terminal 100 through the Universal Serial Bus (USB) standard.

The display device 300 may be a TV.

The portable device 200 and the display device 300 can communicate through the Wi-Fi standard.

Figure 2:
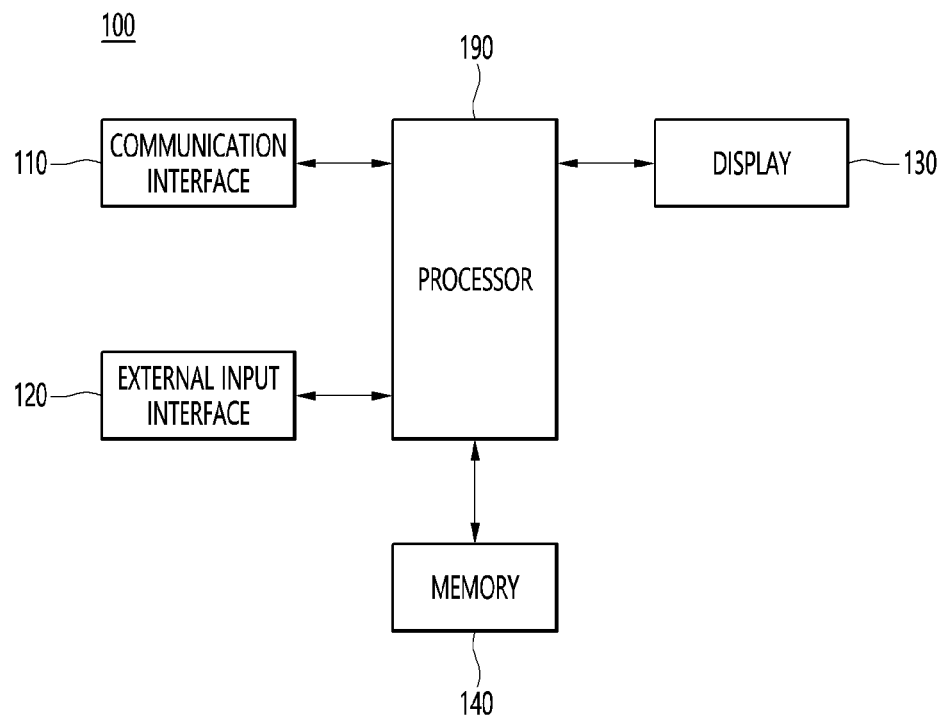
FIG. 2 is a block diagram illustrating the configuration of a terminal according to an embodiment of the present disclosure.

FIG. 2 is a block diagram illustrating the configuration of a terminal according to an embodiment of the present disclosure.

Referring to FIG. 2, the terminal 100 according to an embodiment of the present disclosure may include a communication interface 110, an external input interface 120, a display 130, a memory 140, and a processor 190.

The communication interface 110 can communicate with external devices wired or wirelessly. The communication interface 110 may include Wi-Fi and Bluetooth modules.

The external input interface 120 can receive data and information from external devices. In particular, the external input interface 120 may receive data necessary for installing the screen sharing program from the input/output interface 220 of the portable device 200.

The external input interface 120 may provide a connection path between the terminal 100 and an external device.

The external input interface 120 may include a plurality of external input terminals. The plurality of external input terminals may include an RGB terminal, one or more High Definition Multimedia Interface (HDMI) terminals, and a component terminal.

The display 130 can display images.

The memory 140 may store programs for processing and controlling each signal in the processor 190 and store signal-processed image, voice, or data signals.

The processor 190 may control the overall operation of the terminal 100.

Figure 3:
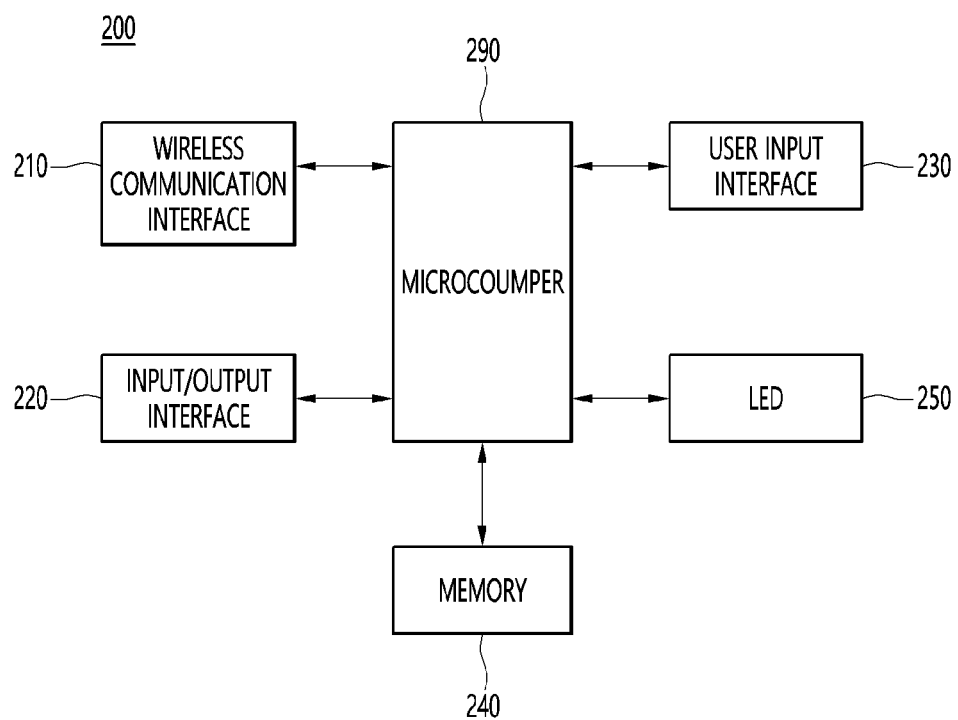
FIG. 3 is a block diagram illustrating the configuration of a portable device according to an embodiment of the present disclosure.

FIG. 3 is a block diagram illustrating the configuration of a portable device according to an embodiment of the present disclosure.

The portable device 200 may include a wireless communication interface 210, an input/output interface 220, a user input interface 230, a memory 240, an LED 250, and a microcomputer 290.

The wireless communication interface 210 may perform wireless communication with the display device 300. The wireless communication interface 210 may perform wireless communication with the display device 300 through the Wi-Fi standard.

For this purpose, the wireless communication interface 210 may include a Wi-Fi module.

The input/output interface 220 may provide a connection path with the terminal 100 through the USB standard.

User input interface 230 may include one or more physical buttons. The button may be used to switch between screen sharing status, multi-screen sharing mode, and single screen sharing mode.

The memory 240 may store a screen sharing program and data necessary for installing a screen sharing program.

The LED 250 may output a specific color to indicate the screen sharing status with the display device 300.

When the portable device 200 is in a connection waiting state (screen sharing state) with the display device 300, the LED 250 outputs a light green color, and when the portable device 200 is in a connection state (screen sharing state), the LED 250 outputs a green color, and if the connection is in an unstable state, the LED 250 may output a red color.

The microcomputer 290 may control the overall operation of the portable device 200.

Figure 4:
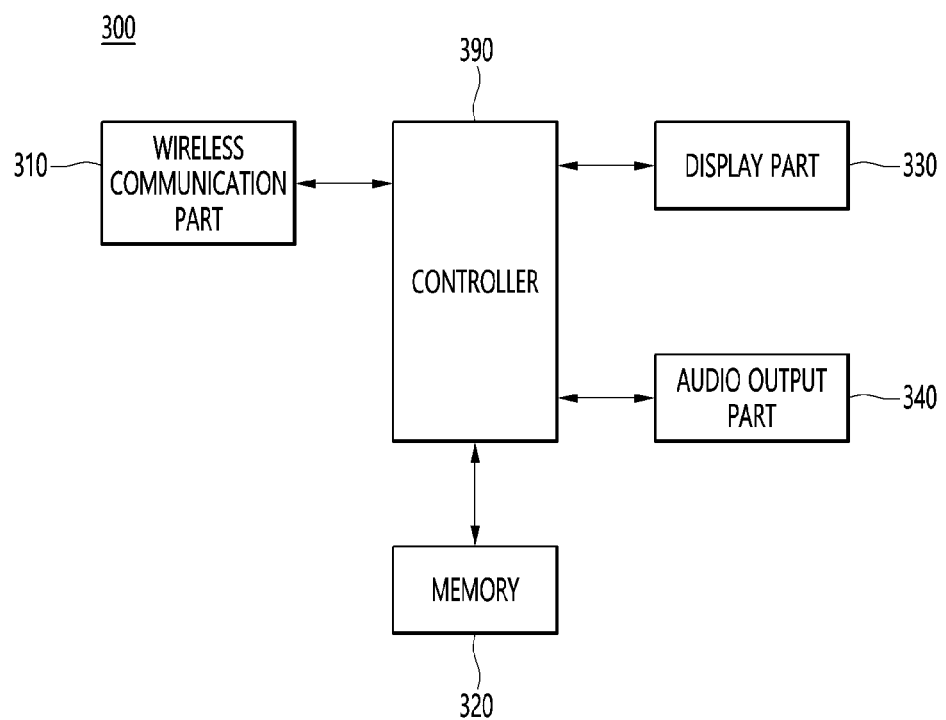
FIG. 4 is a block diagram illustrating the configuration of a display device according to an embodiment of the present disclosure.

FIG. 4 is a block diagram illustrating the configuration of a display device according to an embodiment of the present disclosure.

Referring to FIG. 4, the display device 300 may include a wireless communication part 310, a memory 320, a display part 330, an audio output part 340, and a controller 390.

The wireless communication part 310 may perform wireless communication with the portable device 200. The wireless communication part 310 may communicate with the portable device 200 through Wi-Fi or Wi-Fi Direct standards.

The memory 320 may store a screen sharing control program. The screen sharing control program may be a program that decodes image data received from the portable device 200 and controls output of the mirroring image based on the decoded data.

The display part 330 can display image signals, data signals, and OSD signals processed by the controller 190.

The audio output part 340 can output an audio signal.

The controller 390 may control the overall operation of the display device 300.

Figure 5:
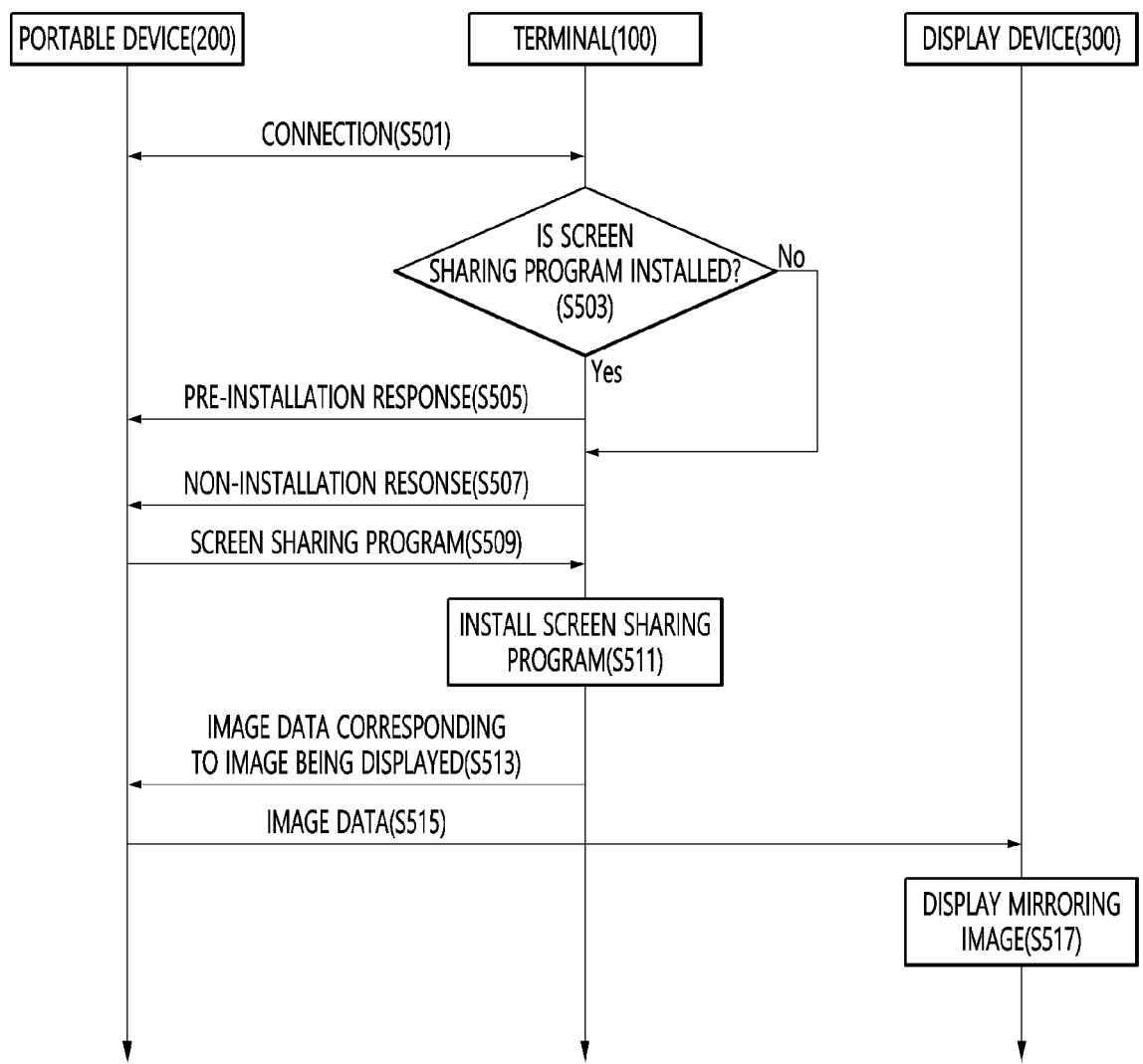
FIG. 5 is a ladder diagram for illustrating the method for operating the screen sharing system according to an embodiment of the present disclosure.

FIG. 5 is a ladder diagram for illustrating the method for operating the screen sharing system according to an embodiment of the present disclosure.

Referring to FIG. 5, when the terminal 100 and the portable device 200 are connected (S501), the terminal 100 determines whether a screen sharing program is installed (S503).

The terminal 100 is connected to the input/output interface 220 of the portable device 200 through the external input interface 120 and may exchange data.

The terminal 100 and the portable device 200 can be connected to each other through the USB standard.

The user can plug the portable device 200 into the USB terminal provided on the external input interface 120 of the terminal 100.

When the portable device 200 is connected, the processor 190 of the terminal 100 may determine whether a screen sharing program is installed in the memory 140.

The screen sharing program may be a program for sharing the screen by transmitting the screen being displayed on the display 130 of the terminal 100 to the display device 300 through the portable device 200.

A screen sharing program is installed in the memory 240 of the portable device 200. The memory 240 of the portable device 200 may store program data necessary for installing a screen sharing program.

The processor 190 of the terminal 100 may determine whether the screen sharing program installed on the portable device 200 is also installed upon the connection of the portable device 200.

The portable device 200 may inquire with the terminal 100 whether a screen sharing program is installed.

When the screen sharing program is installed, the terminal 100 transmits a pre-installation response indicating that the program has been installed to the portable device 200 (S505).

In this case, the terminal 100 can automatically run the screen sharing program upon connection to the portable device 200. In other words, the terminal 100 may enter a waiting state for screen sharing with the display device 300.

The processor 190 of the terminal 100 may transmit a pre-installation response to the input/output interface 220 of the portable device 200 through the external input interface 120.

When the terminal 100 determines that the screen sharing program is not installed, the terminal transmits a non-installation response indicating that the program is not installed to the portable device 200 (S507).

Additionally, when the processor 190 of the terminal 100 determines that the screen sharing program is not installed, it may display a pop-up window inquiring about installing the screen sharing program through the display 130.

This will be explained with reference to FIG. 6.

Figure 6:
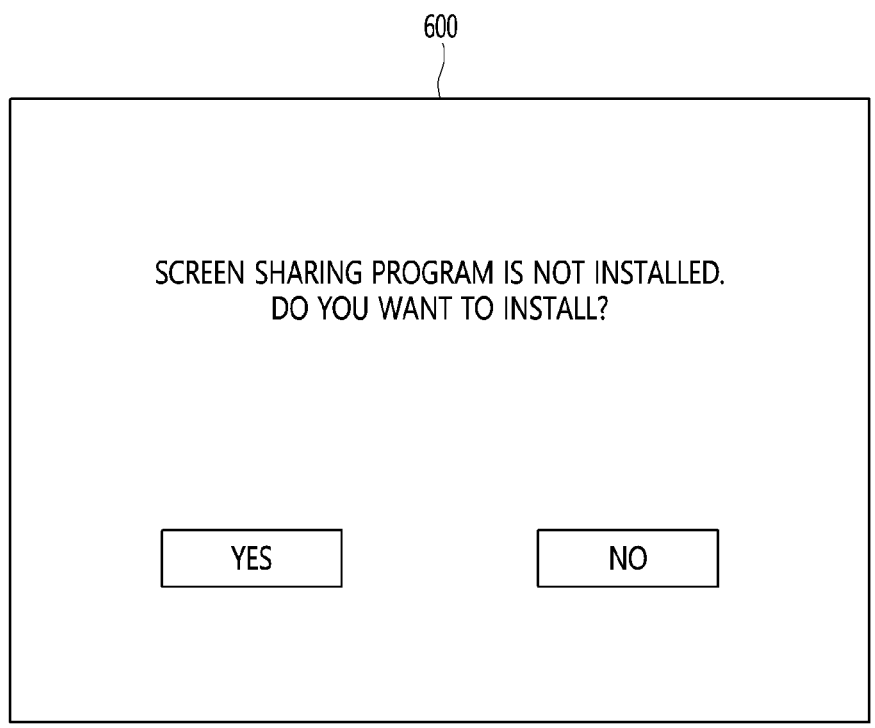
FIG. 6 is a diagram illustrating a pop-up window that induces installation of a screen sharing program according to an embodiment of the present disclosure.

FIG. 6 is a diagram illustrating a pop-up window that induces installation of a screen sharing program according to an embodiment of the present disclosure.

When the processor 190 of the terminal 100 is connected to the portable device 200, but the screen sharing program is not installed, a pop-up window 600 prompting installation of the screen sharing program may be displayed on the display 130.

The user can select the <YES> item included in the pop-up window 600 to have the screen sharing program installed on the terminal 100.

Again, FIG. 5 will be described.

The portable device 200 transmits program data to the terminal 100 to install the screen sharing program based on the non-installation response (S509).

The microcomputer 290 of the portable device 200 may transmit program data to the external input interface 120 of the terminal 100 based on the non-installation response.

Program data may include installation files for screen sharing programs.

The terminal 100 installs a screen sharing program using the program data received from the portable device 200 (S511).

The processor 190 of the terminal 100 may install the screen sharing program in the memory 140 using program data.

Afterwards, the terminal 100 transmits image data corresponding to the image being displayed through the display 130 to the portable device 200 (S513).

The processor 190 of the terminal 100 may receive a screen sharing request from the portable device 200 and may transmit image data to the portable device 200 in response to the received screen sharing request.

The microcomputer 290 of the portable device 200 may receive a screen sharing request through the user input interface 230. The user input interface 230 may include physical buttons.

When the physical button is selected, the portable device 200 may determine that a screen sharing request has been received.

Specifically, in a state where the portable device 200 is in a ready state for connection with the display device 300, when a physical button is selected, the portable device may be determined that a screen sharing request has been received.

The portable device 200 transmits the image data received from the terminal 100 to the display device 300 (S515).

The microcomputer 290 of the portable device 200 may transmit image data corresponding to the image being displayed by the terminal 100 to the wireless communication part 310 of the display device 300 through the wireless communication interface 210.

In addition to image data, the portable device 200 may transmit audio data corresponding to audio output by the terminal 100 to the display device 300.

Each of the wireless communication interface 210 and the wireless communication part 310 may include a Wi-Fi module.

In other words, the portable device 200 may transmit image data to the display device 300 through the Wi-Fi standard.

The display device 300 displays a mirroring image based on the image data received from the portable device 200 (S517).

The display device 300 may be installed with a display control program capable of displaying image data received from the portable device 200, and may display a mirroring image based on the image data using the display control program.

The display control program may be a program for decoding image data or audio data received from the portable device 200 and controlling display of the decoded image data.

Accordingly, the terminal 100 and the display device 300 can share the same screen.

Figure 7:
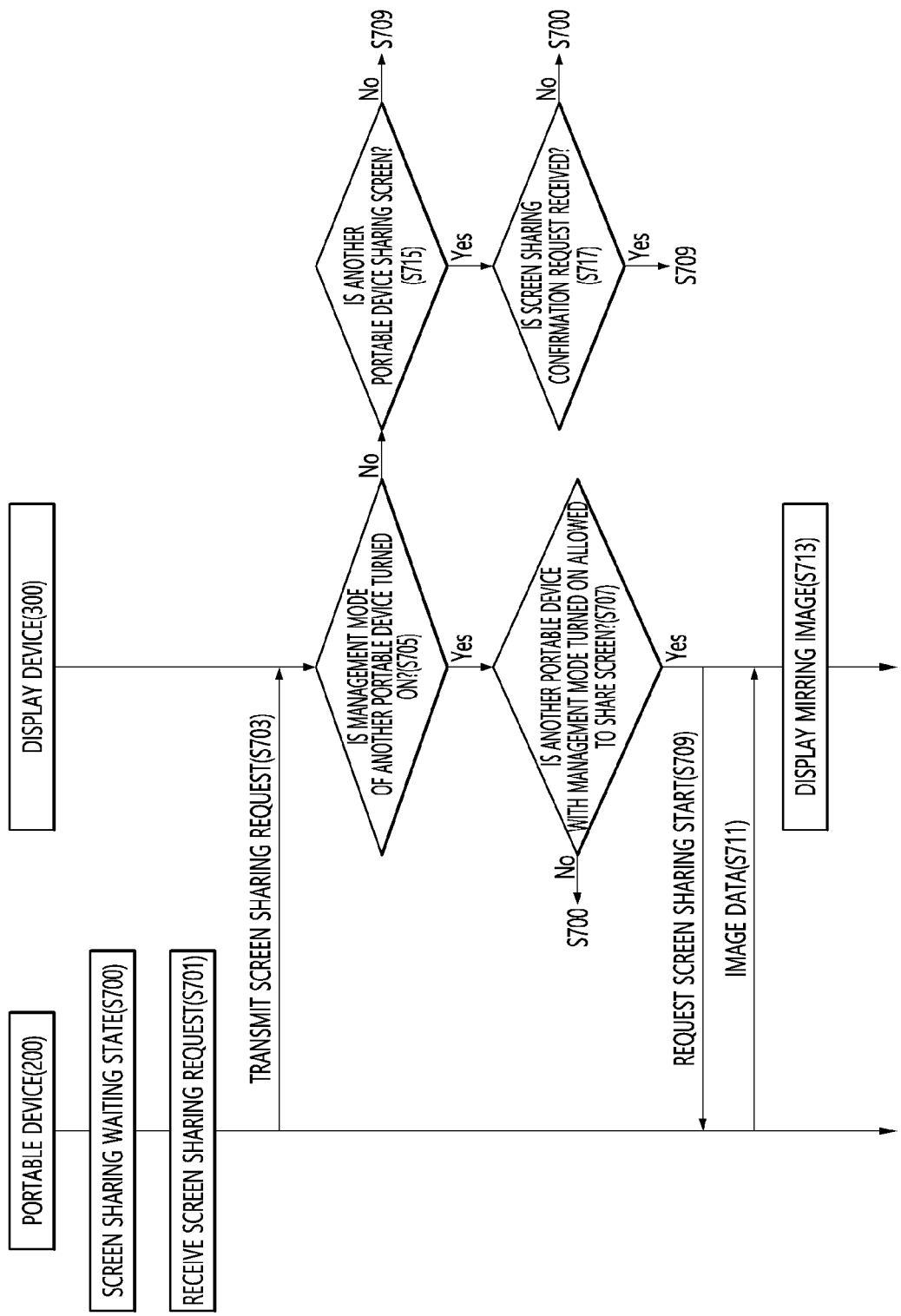
FIG. 7 is a ladder diagram explaining the method of operating a screen sharing system according to another embodiment of the present disclosure.

FIG. 7 is a ladder diagram explaining the method of operating a screen sharing system according to another embodiment of the present disclosure.

In particular, FIG. 7 is a diagram of a scenario in which one screen is shared through one portable device 200.

Steps S700 to S709 of FIG. 7 may be steps executed between steps S511 and S513 of FIG. 5.

Referring to FIG. 7, the portable device 200 is in a screen sharing waiting state (S700).

In the screen sharing waiting state of the portable device 200, the LED 230 may output the first color. The first color may be light green, but this is only an example.

The screen sharing waiting state may be a state where the terminal 100 is waiting to share the image being displayed.

The portable device 200 receives a screen sharing request in a screen sharing waiting state (S701).

In one embodiment, a screen sharing request may be received through the user input interface 230 provided in the portable device 200.

When a physical button included in the user input interface 230 is selected, the microcomputer 290 of the portable device 200 may determine that a screen sharing request has been received.

The portable device 200 transmits the received screen sharing request to the display device 300 (S703).

The microcomputer 290 of the portable device 200 may transmit a screen sharing request to the wireless communication part 310 of the display device 300 through the wireless communication interface 210.

The screen sharing request may include one or more of identification information identifying the portable device 200 and identification information of the terminal 100 connected to the portable device 200 through the USB standard.

The screen sharing request may be a request to share the screen of the terminal 100 connected to the portable device 200.

The display device 300 determines whether the management mode of the other portable device is turned on according to the screen sharing request (S705).

In one embodiment, the management mode (admin mode) is a mode that can manage screen sharing authority, and when there are a plurality of portable devices connected to the display device 300, only one portable device may be set to the management mode.

Only one portable device may be turned on in the management mode.

The display device 300 can check which of the plurality of portable devices connected to the display device 300 is set to the management mode.

The display device 300 may identify the portable device of the plurality of portable devices which is first transmitted a request to activate the management mode, and determine that only the identified portable device has activated the management mode.

The display device 300 may identify the device of the first portable device and the second portable device which is first received a request for the management mode as the management device with screen sharing authority.

When the management mode of another portable device is turned on, the display device 300 determines whether screen sharing permission from the portable device has been received (S707).

When the management mode of the other portable device is set to turn on, the controller 390 of the display device 300 may determine whether screen sharing permission has been received from the other portable device. This is because management mode is set to on in other portable devices.

When screen sharing permission is received, the display device 300 requests the portable device 200 to start screen sharing (S709).

When the controller 390 of the display device 300 receives screen sharing permission from another portable device whose management mode is set to turn on, the controller 390 may request the portable device 200 to start screen sharing.

The portable device 200 transmits the image data received from the terminal 100 to the display device 300 (S711), and the display device 300 displays a mirroring image based on the received image data (S713).

Meanwhile, when the management mode of the other portable device is turned off (S705), the display device 300 determines whether the other portable device is sharing the screen (S715).

Even if the other portable device is not set to the management mode, the screen of the terminal connected to the other portable device may be shared by transmitting image data to the display device 300.

The controller 390 of the display device 300 may determine whether image data for screen sharing is being received from another portable device.

When no other portable device is sharing the screen, the display device 300 performs S709.

When no other portable device is sharing the screen, the controller 390 of the display device 300 may request the portable device 200 to start screen sharing.

When another portable device is sharing the screen, the display device 300 determines whether the other portable device receives a screen sharing confirmation request to share the screen through the portable device 200 even though the other portable device is sharing the screen (S717).

When the controller 390 of the display device 300 receives a screen sharing request from the portable device 200 while sharing the screen through another portable device, the controller may display a pop-up window notifying this on the display part 330.

The display device 300 may receive a screen sharing confirmation request through a pop-up window.

The controller 390 of the display device 300 may receive a screen sharing confirmation request from another portable device.

When the display device 300 receives screen sharing confirmation, it performs S709.

Meanwhile, when the display device 300 does not receive screen sharing confirmation, it performs S700.

FIG. 7 is explained through an actual scenario.

Figure 8:
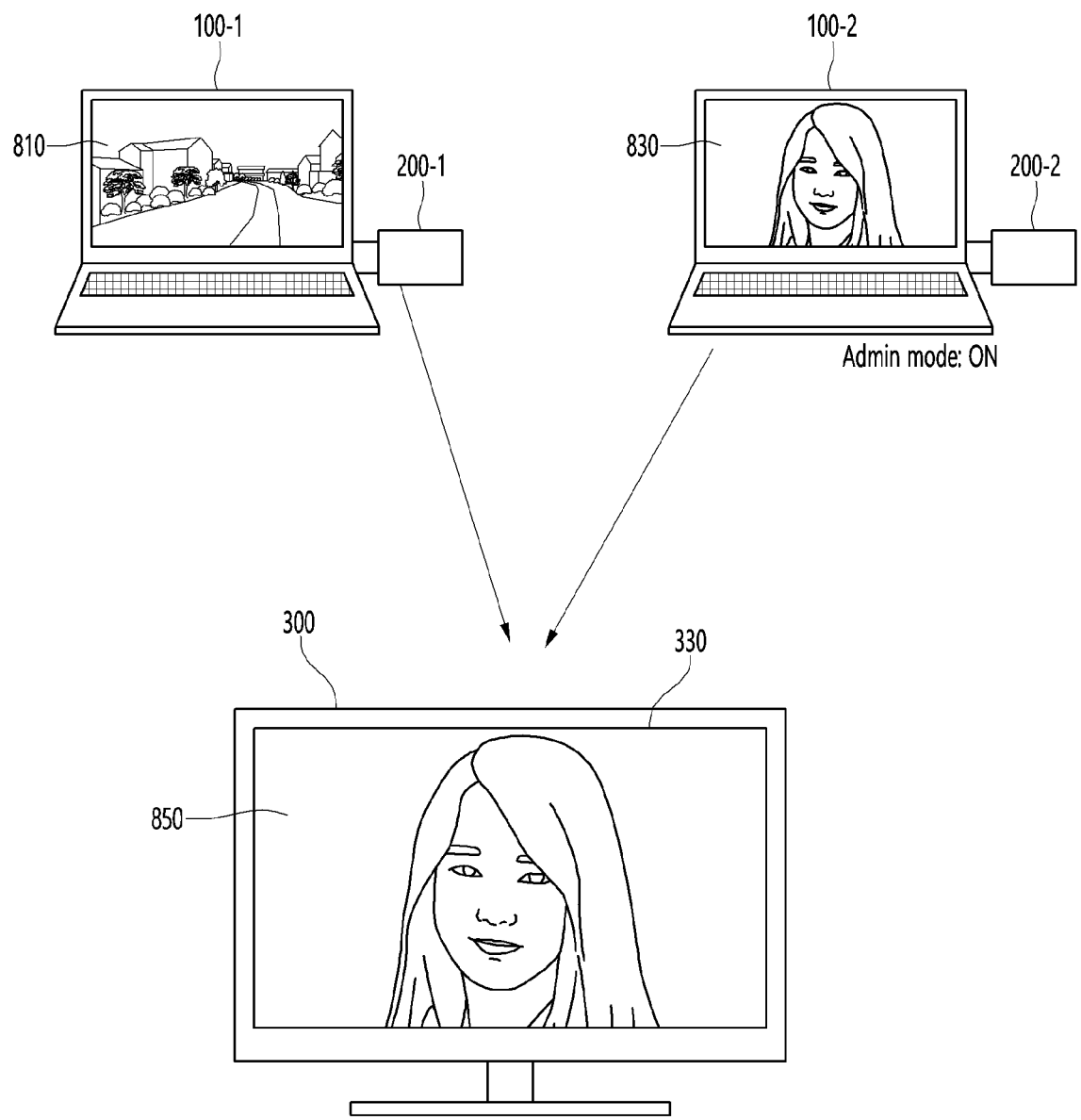
FIGS. 8 to 10 are diagrams illustrating an example of providing a screen sharing service through one of two portable devices.
Figure 9:
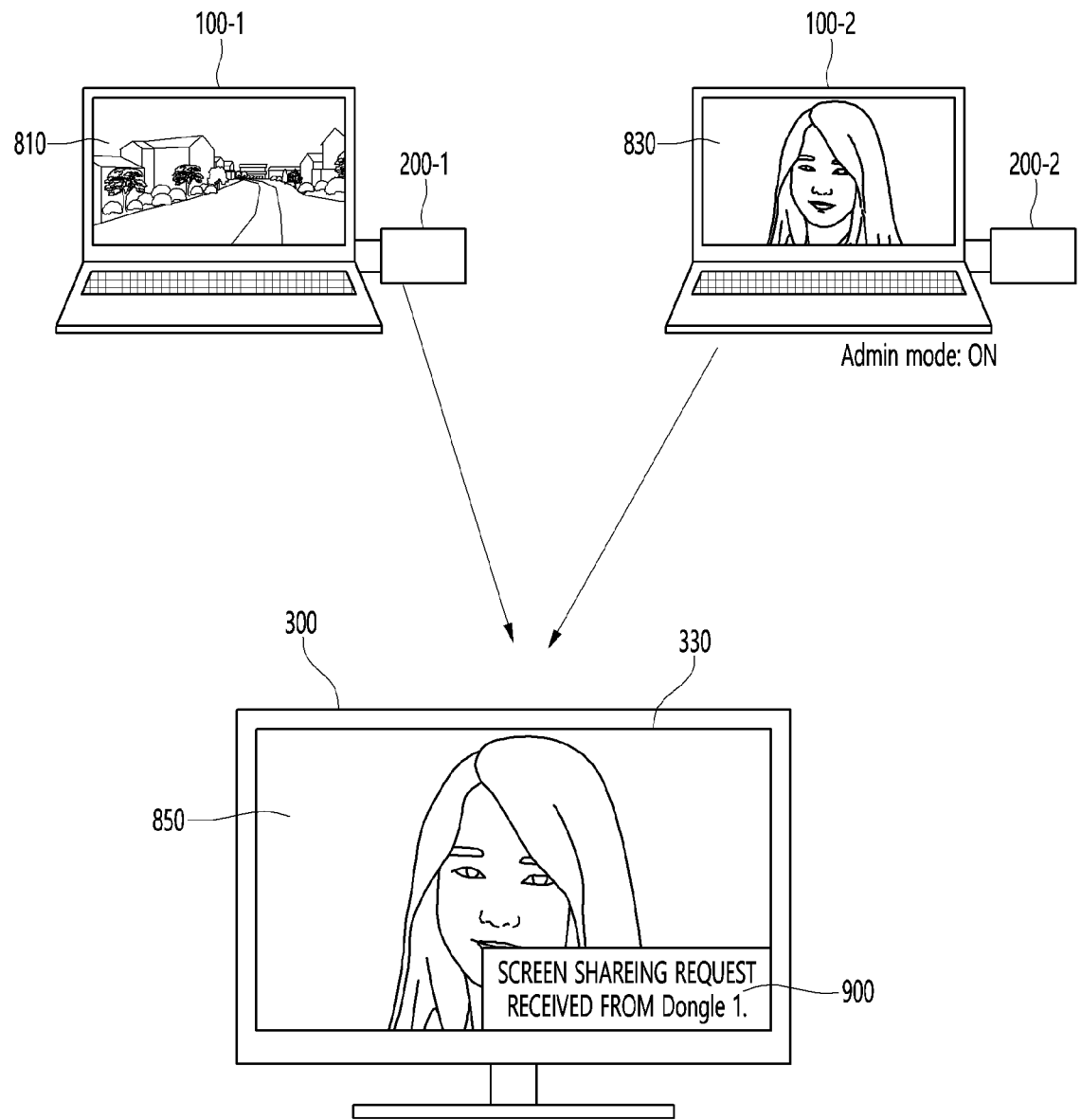
Figure 10:
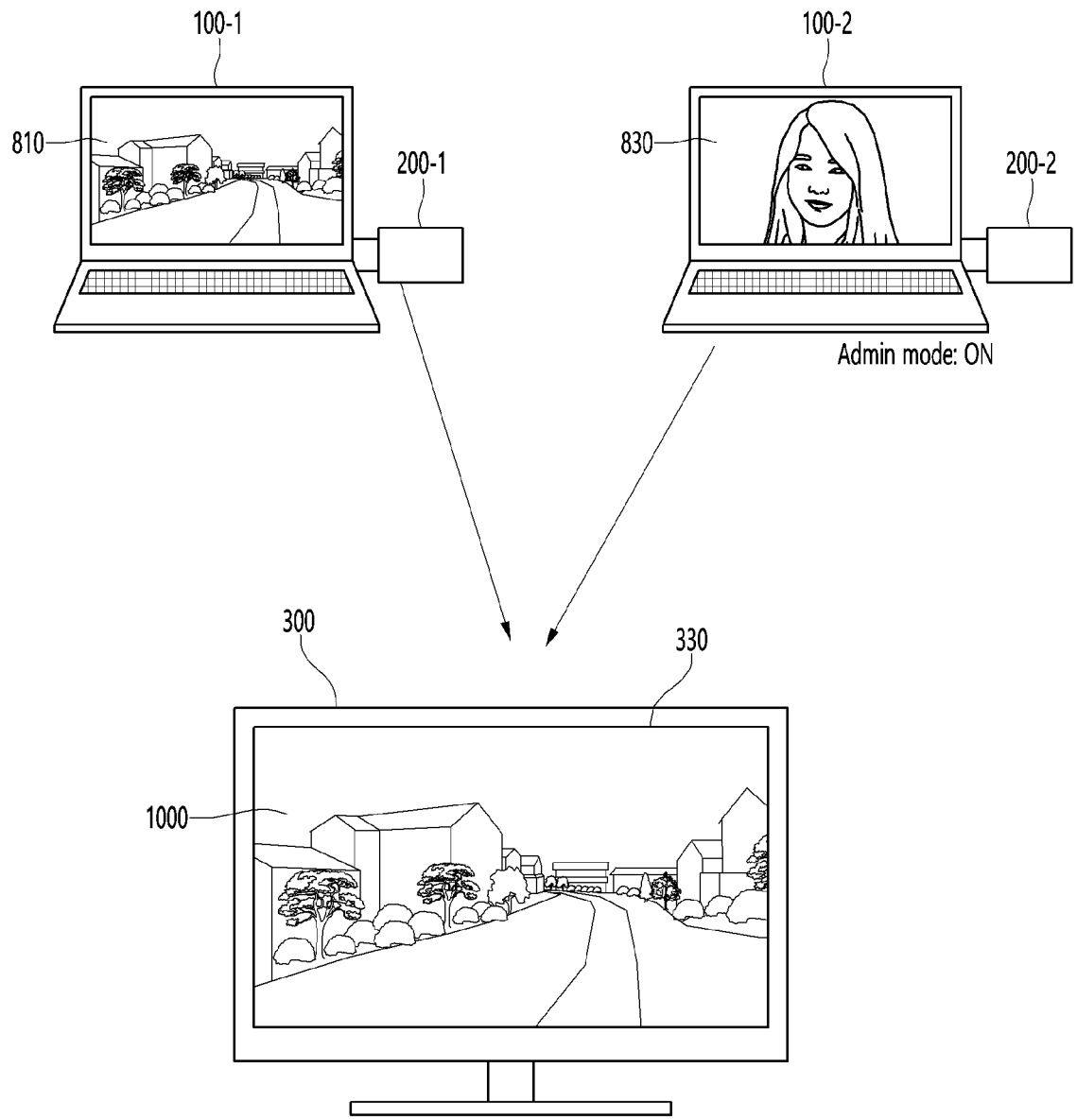

FIGS. 8 to 10 are diagrams illustrating an example of providing a screen sharing service through one of two portable devices.

In FIG. 8, the first terminal 100-1 is connected to the first portable device 200-1, and the second terminal 100-2 is connected to the second portable device 200-2.

Additionally, the first terminal 100-1 is displaying the first image 810, the second terminal 100-2 is displaying the second image 830, and the display device 300 is displaying a mirroring image 850 based on the second image 830.

In other words, the display device 300 displays the second mirroring image 850 on the display part 330 based on the image data received from the second portable device 200-2.

Additionally, it is assumed that a management mode with screen sharing management authority is set in the second portable device 200-2.

The display device 300 may receive a screen sharing request from the first portable device 200-1.

In response to the received screen sharing request, the display device 300 may display a notification 900 indicating that a screen sharing request has been received from the first portable device 200-1 on the display part 330, as illustrated in FIG. 9.

The display device 300 may receive a screen sharing permission message allowing screen sharing of the first portable device 200-1 from the second portable device 200-2.

The display device 300 may determine that permission to share the screen will be received from the second portable device 200-2.

In response to a screen sharing confirmation request, the display device 300 may convert the second mirroring image 850 into the first mirroring image 1000 based on the first image 810, as illustrated in FIG. 10.

In other words, the display device 300 receives image data corresponding to the first image 810 from the first portable device 200-1 and may output the first mirroring image 1000 on the display part 330 using a display control program.

Accordingly, the display device 300 may provide a screen sharing service through the first portable device 200-1.

As such, according to an embodiment of the present disclosure, the screen of the terminal may be shared with a display device having a large screen in a wireless environment without a separate wired cable.

Additionally, since image data for screen sharing is transmitted to the display device through a portable device, there are no restrictions on using the terminal's Wi-Fi standard.

Figure 11:
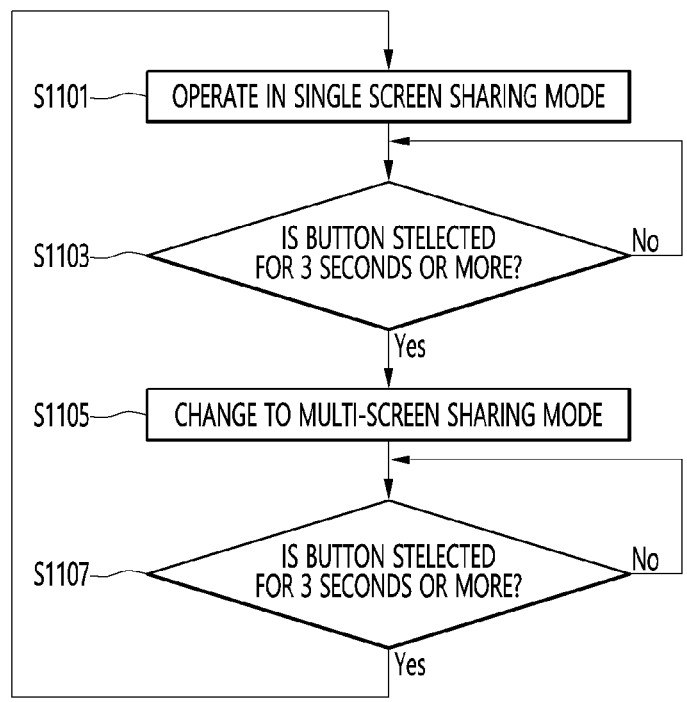
FIG. 11 is a flowchart illustrating a process of changing the operation mode of a portable device from a single screen sharing mode to a multi-screen sharing mode, according to an embodiment of the present disclosure.

FIG. 11 is a flowchart illustrating a process of changing the operation mode of a portable device from a single screen sharing mode to a multi-screen sharing mode, according to an embodiment of the present disclosure.

Referring to FIG. 11, the microcomputer 290 of the portable device 200 operates in single screen sharing mode (S1101).

The single screen sharing mode may be a mode in which the display device 300 shares the screen with one portable device 200.

The microcomputer 290 of the portable device 200 determines whether a button provided on the user input interface 230 has been selected for 3 seconds or more (S1103).

When a button provided on the user input interface 230 is selected for 3 seconds or more, the microcomputer 290 of the portable device 200 changes the operation mode from the single screen sharing mode to the multi-screen operation mode (S1105).

The multi-screen sharing mode may be a mode for sharing a plurality of screens through a plurality of portable devices connected to each of a plurality of terminals.

The microcomputer 290 of the portable device 200 changes the operation mode from the multi-screen sharing mode to the single screen sharing mode when the button is selected for 3 seconds or more (S1107) under the multi-screen sharing mode.

Figure 12:
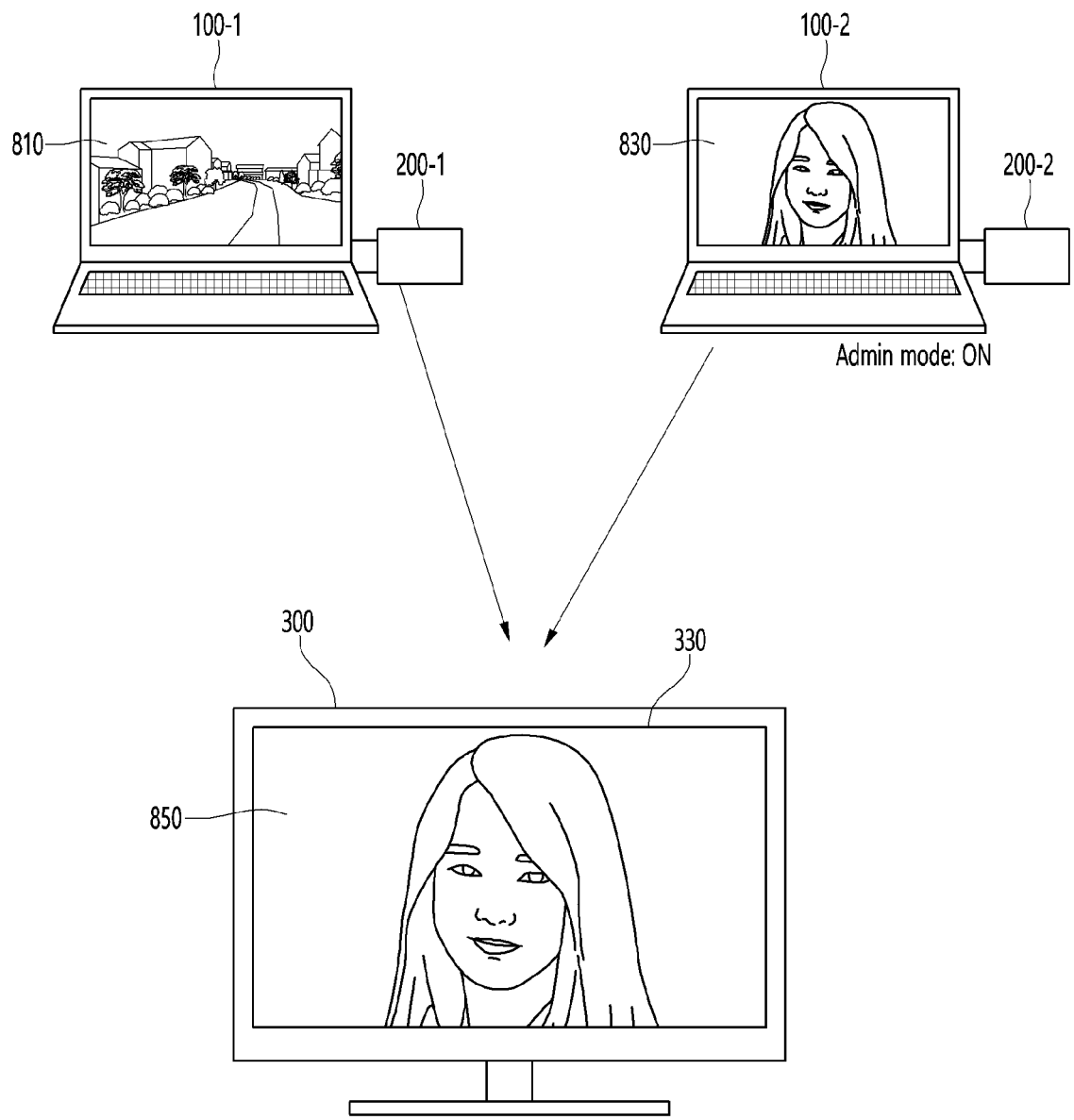
FIGS. 12 to 14 are diagrams of a scenario in which a plurality of screens are shared through a plurality of portable devices.
Figure 13:
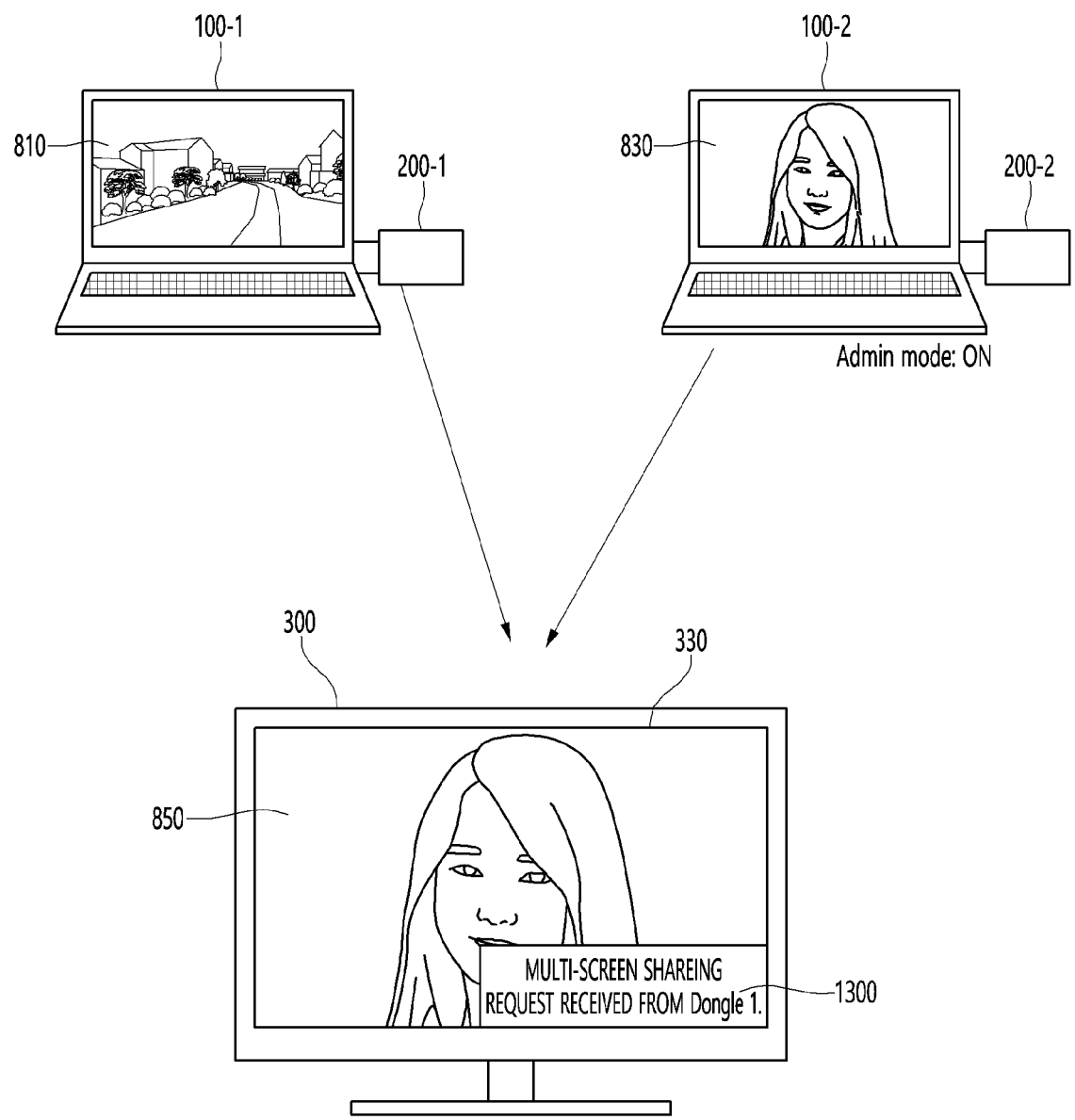
Figure 14:
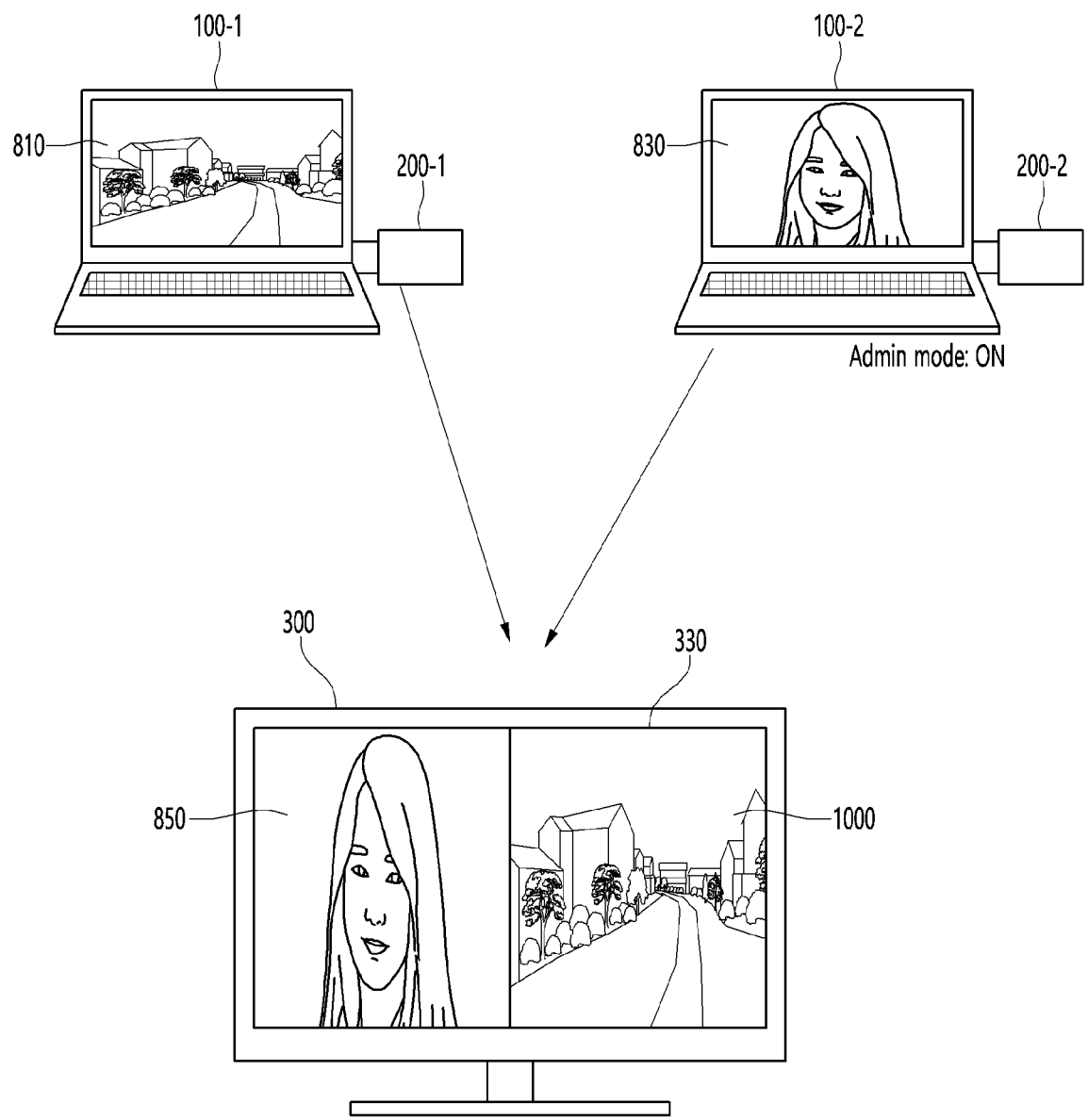

FIGS. 12 to 14 are diagrams of a scenario in which a plurality of screens are shared through a plurality of portable devices.

In FIG. 12, the first terminal 100-1 is connected to the first portable device 200-1, and the second terminal 100-2 is connected to the second portable device 200-2.

Additionally, the first terminal 100-1 is displaying the first image 810, the second terminal 100-2 is displaying the second image 830, and the display device 300 is displaying a mirroring image 850 based on the second image 830.

In other words, the display device 300 displays the second mirroring image 850 on the display part 330 based on the image data received from the second portable device 200-2.

In addition, it is assumed that a management mode with screen sharing management authority is set in the second portable device 200-2, and each of the first portable device 200-1 and the second portable device 200-2 is operated in a multi-screen sharing mode.

The first portable device 200-1 may receive a button selection input while in a screen sharing waiting state. The first portable device 200-1 may transmit a screen sharing request to the display device 300 according to a button selection input.

In response to the received screen sharing request, the display device 300 may display a notification 1300 indicating that a multi-screen sharing request has been received from the first portable device 200-1 on the display part 330, as illustrated in FIG. 13.

The display device 300 may receive a multi-screen sharing permission message allowing screen sharing of the first portable device 200-1 from the second portable device 200-2.

The display device 300 may determine that permission to share the screen will be received from the second portable device 200-2.

Upon receipt of the multi-screen sharing permission, the display device 300 may display the second mirroring image 850 and the first mirroring image 1000 based on the first image 810 into split screens, as illustrated in FIG. 14.

In other words, the display device 300 may receive image data corresponding to the first image 810 from the first portable device 200-1 and may output the first mirroring image 1000 together with the second the mirroring image 850 on the display part 330, using a display control program.

Accordingly, the display device 300 may provide a multi-screen sharing service through the first and second portable devices 200-1 and 2000-2.

As such, according to an embodiment of the present disclosure, the screens of a plurality of terminals may be shared on a display device having a large screen in a wireless environment without a separate wired cable.

Meanwhile, according to another embodiment of the present disclosure, when sharing a multi-screen, the display device 300 may adjust the arrangement and order of screens, and may cancel the screen of a portable device that is not in the management mode.

According to one embodiment of the present disclosure, the above-described method can be implemented as processor-readable code on a program-recorded medium. Examples of media that the processor can read include ROM, RAM, CD-ROM, magnetic tape, floppy disk, and optical data storage devices.

The display device described above is not limited to the configuration and method of the above-described embodiments, and the embodiments may be configured by selectively combining all or part of each embodiment so that various modifications can be made.

The invention claimed is:

1. A display device comprising:
a display;
a transceiver configured to perform wireless communication with a first portable device connected to a first terminal displaying a first image or a second portable device connected to a second terminal displaying a second image; and
a controller configured to:
based on a screen sharing request is received from the first portable device, determine whether a screen sharing admin mode of the second portable device for managing screen sharing is activated, and
based on the screen sharing admin mode of the second portable device being activated-determine whether permission has been received from the second portable device for screen sharing;
and;
based on the permission having been received, receive first image data corresponding to the first image from the first portable device; and display a first mirroring image based on the first image data on the display; and
based on the screen sharing admin mode of the second portable device not being activated:
determine whether the second terminal is sharing the second image being displayed through the second portable device; and
based on a determination that the second image is not being shared, receive the first image data from the first portable device and display the first mirroring image on the display.

2. The display device of claim 1,
wherein the controller is configured to:
based on a determination that the second image is being shared through the second portable device, display a notification indicating that the second image is being shared on the display.

3. The display device of claim 1, further comprising:
a memory configured to store a screen control program which decodes image data received from the portable devices and displays a mirroring image based on the decoded data.

4. The display device of claim 1,
wherein the controller is configured to:
based on the first portable device and the second portable device operating in a multi-screen sharing mode, concurrently display the first mirroring image and a second mirroring image on divided parts of the display based on the second image being displayed by the second terminal.

5. The display device of claim 1,
wherein the controller is configured to identify a device of the first portable device and the second portable device which first receives a request for the screen sharing admin mode as a management device.

6. The display device of claim 1,
wherein the transceiver includes a WiFi module.

7. A method for operating a display device comprising:
receiving a screen sharing request from a first portable device connected to a first terminal displaying a first image;
determining whether a screen sharing admin mode of a second portable device for managing screen sharing of the second portable device connected to a second terminal is activated;
based on the screen sharing admin mode of the second portable device being activated:
determining whether screen sharing permission has been received from the second portable device for screen sharing; and
based on the permission having been received, receiving first image data corresponding to the first image from the first portable device and displaying a first mirroring image based the first image data on a display of the display device; and
based on the screen sharing admin mode of the second portable device not being activated:
determining whether the second terminal is sharing a second image being displayed through the second portable device; and
based on a determination that the second image is not being shared, receiving the first image data from the first portable device and displaying the first mirroring image on the display.

8. The method for operating a display device of claim 7, further comprising:
based on a determination that the second image is being shared through the second portable device, displaying a notification indicating that the second image is being shared.

9. The method for operating a display device of claim 7, further comprising:
decoding image data received from the portable device and storing a screen control program to display a mirroring image based on the decoded data.

10. The method for operating a display device of claim 7, further comprising:
based on the first portable device and the second portable device operating in a multi-screen sharing mode, concurrently displaying the first mirroring image and a second mirroring image on divided parts of the display based on the second image being displayed by the second terminal containing.

11. The method for operating a display device of claim 7, further comprising:
identifying a device of the first portable device and the second portable device which first receives a request for the screen sharing admin mode as a management device.

* * * * *